United States Patent [19]

Firey

[11] Patent Number: 4,653,436
[45] Date of Patent: Mar. 31, 1987

[54] UNTIMED REFUEL AND ASH REMOVAL FOR CHAR BURNING ENGINES

[76] Inventor: Joseph C. Firey, P.O. Box 15514, Seattle, Wash. 98115-0514

[21] Appl. No.: 819,362

[22] Filed: Jan. 16, 1986

[51] Int. Cl.⁴ .................. F02B 45/02; F02D 19/04
[52] U.S. Cl. ............................................. 123/23
[58] Field of Search .............. 123/23, 1 R, 24; 60/39, 60/464

[56] References Cited

U.S. PATENT DOCUMENTS

| | | | |
|---|---|---|---|
| 974,087 | 10/1910 | Low | 123/23 |
| 2,396,524 | 3/1946 | Nettel | 123/23 |
| 2,625,141 | 1/1953 | Berlyn | 123/23 |
| 3,981,277 | 9/1976 | Abom | 123/23 |
| 4,059,078 | 11/1977 | de la Rosa | 123/25 K |
| 4,204,506 | 5/1980 | Bowling | 123/23 |
| 4,333,423 | 6/1982 | Firey | 123/23 |
| 4,372,256 | 2/1983 | Firey | 123/23 |
| 4,412,511 | 11/1983 | Firey | 123/23 |
| 4,584,970 | 4/1986 | Firey | 123/23 |

*Primary Examiner*—William A. Cuchlinski, Jr.

[57] ABSTRACT

Mechanisms for refueling a cyclically pressurized char fuel combustion chamber are described which can function at any time during the cycle of pressurization and expansion. Similar mechanisms for removal of ashes from these cyclically pressurized combustion chambers are also described.

3 Claims, 6 Drawing Figures ns. These are among the beneficial objects of the invention described herein.

UNTIMED REFUEL AND ASH REMOVAL FOR CHAR BURNING ENGINES

CROSS REFERENCES TO RELATED APPLICATIONS

This application may be related to my following U.S. patent applications:
(1) "Cyclic Solid Gas Reactor"; Ser. No. 06/473566; 3/9/83 now U.S. Pat. No. 4,584,970
(2) "Solid With Gas Reactor Plant"; Ser. No. 06/791798; 10/28/85

BACKGROUND OF THE INVENTION (1) Field of the Invention:
This invention is in the field of solid fuel refueling and ash removal devices for pressurized combustion chambers, and particularly for pressurized combustion chambers whose pressure varies cyclically over a wide range.

(2) Description of the Prior Art:
In U.S. Pat. No. 4,412,511 preferred refueling and ash removal devices are described, for use on char and oil burning engines, which time refueling and ash removal to occur only during engine exhaust and intake processes when the combustion chamber pressure is minimum. In this way it is sought to reduce gas leakage. But this requires relatively complex drive means for the refuel mechanism and the ash removal mechanism since refuel and ash removal do not occur during each engine cycle but rather only once every one hundred or more engine cycles. Additionally, these refuel and ash removal drive means must be quick acting since refuel and ash removal are preferably completed during a single engine exhaust and intake process. It would be of benefit to have a refuel mechanism and an ash removal mechanism operable at any part of the engine cycle which could carry out refuel and ash removal more slowly over several engine cycles.

The following issued U.S. patents may be relevant to the examination of this application:
U.S. Pat. No. 4,372,256; J. C. Firey, 2/8/83
U.S. Pat. No. 4,412,511; J. C. Firey, 11/1/83
U.S. Pat. No. 4,455,837; J. C. Firey, 6/26/84
U.S. Pat. No. 4,509,957; J. C. Firey, 4/9/85
U.S. Pat. No. 4,533,362; J. C. Firey, 8/6/85

SUMMARY OF THE INVENTION

Char burning engines, using cyclic compression and expansion of gases into and out of a char fuel mass contained within a combustion chamber, have used refuel and reload means, as well as ash removal means, which are timed with the engine cycle to carry out their function during engine exhaust and intake processes. But these timed means are mechanically complex since they function only once in about every 100 or more engine cycles and large drive forces are needed since each process must be completed within one or a few engine cycles. In the invention described herein, these timed refuel and reload and ash removal means are replaced by untimed refuel and reload and ash removal means which carry out their functions independently of the engine cycle and over a period which can be several engine cycles. As a result the untimed drive means for refuel, reload and ash removal can be mechanically simpler and the untimed drive forces can be smaller than for timed refuel and ash removal drive means. These are among the beneficial objects of the invention described herein.

Figure 2:
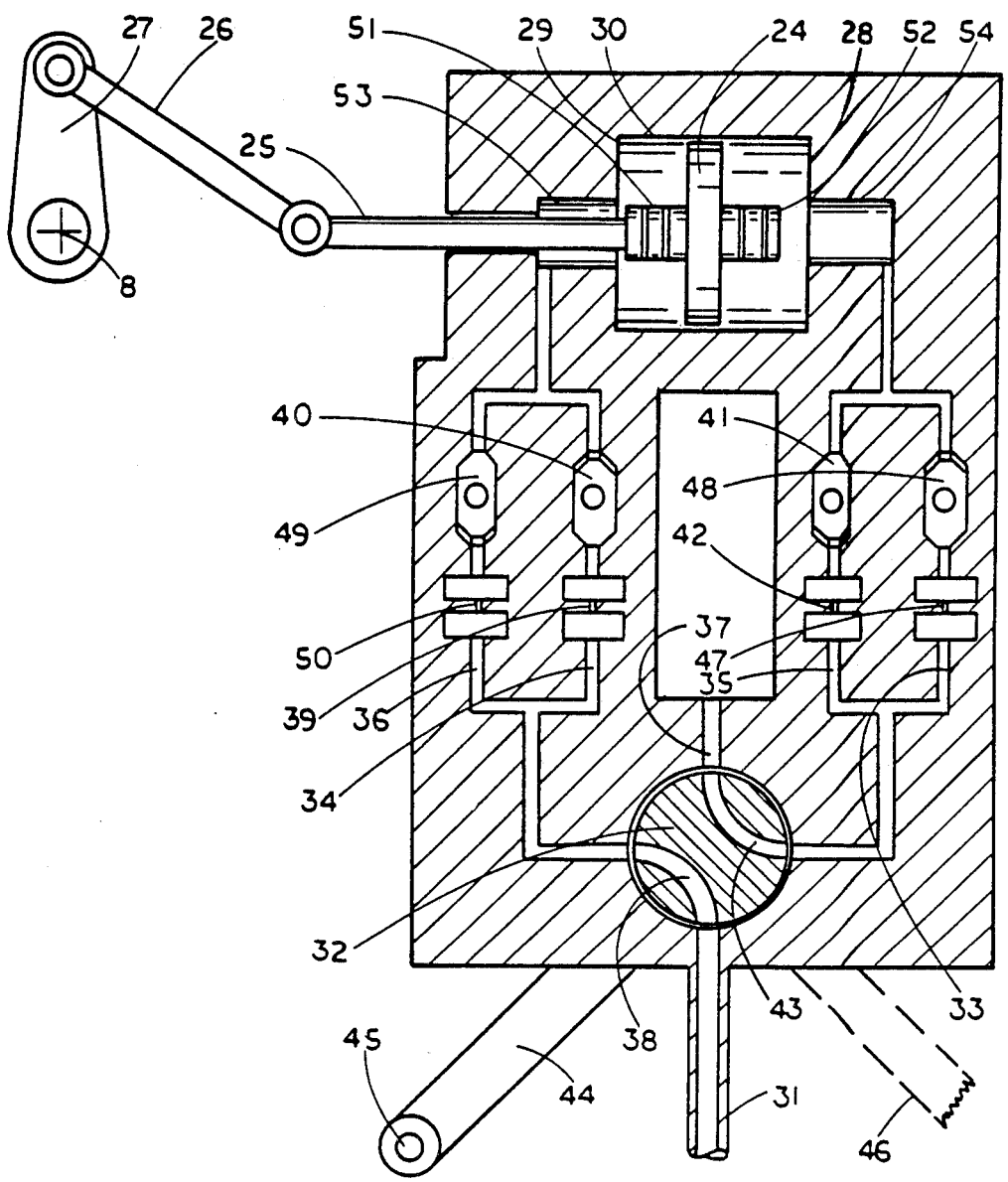

Details of an example untimed drive means are shown in cross-sectional view in FIG. 2 suitable for the driving of untimed refuel and ash removal means.

Figure 3:
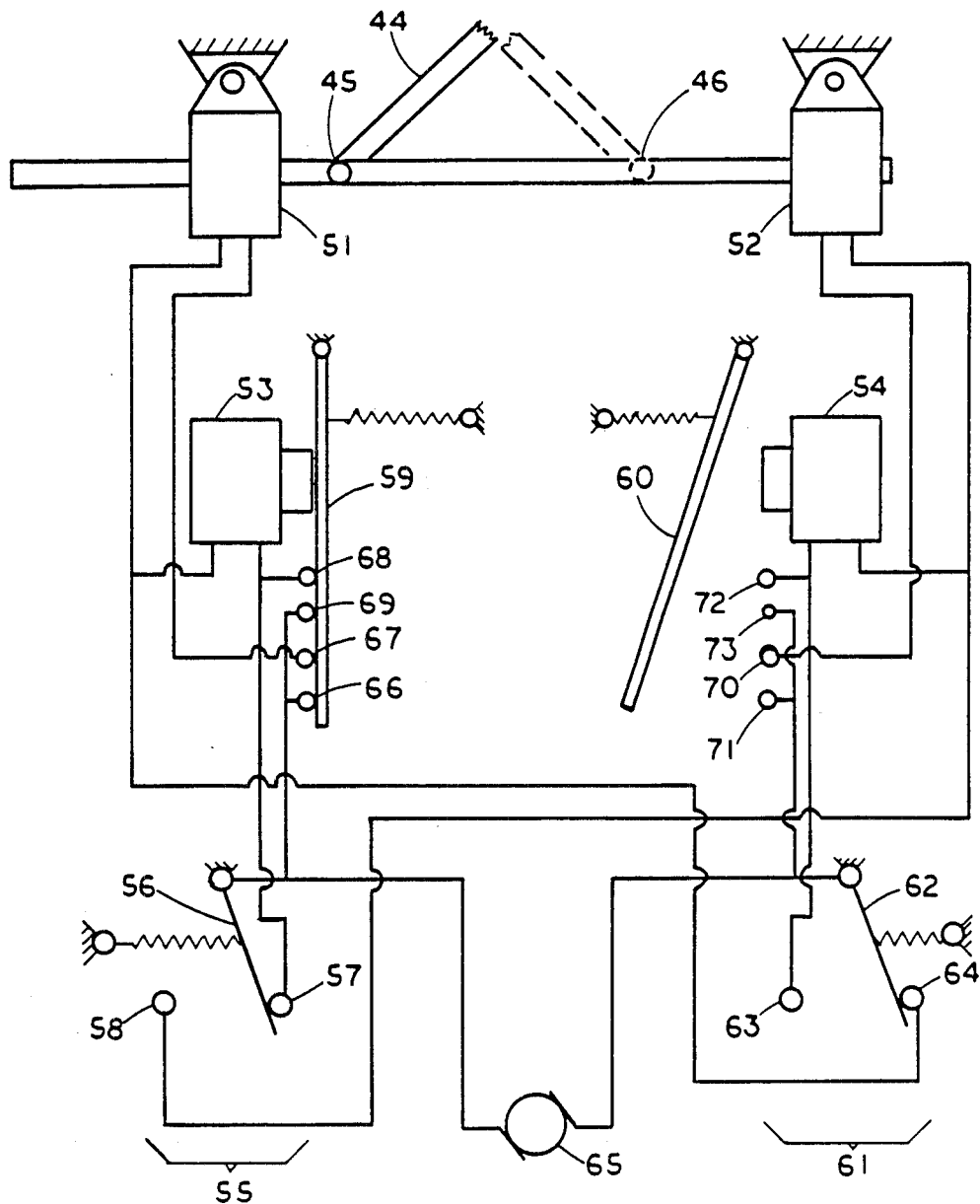

In FIG. 3 a schematic diagram of an electrical control means is shown suitable for controlling the drive means of untimed refuel means.

Figure 4:
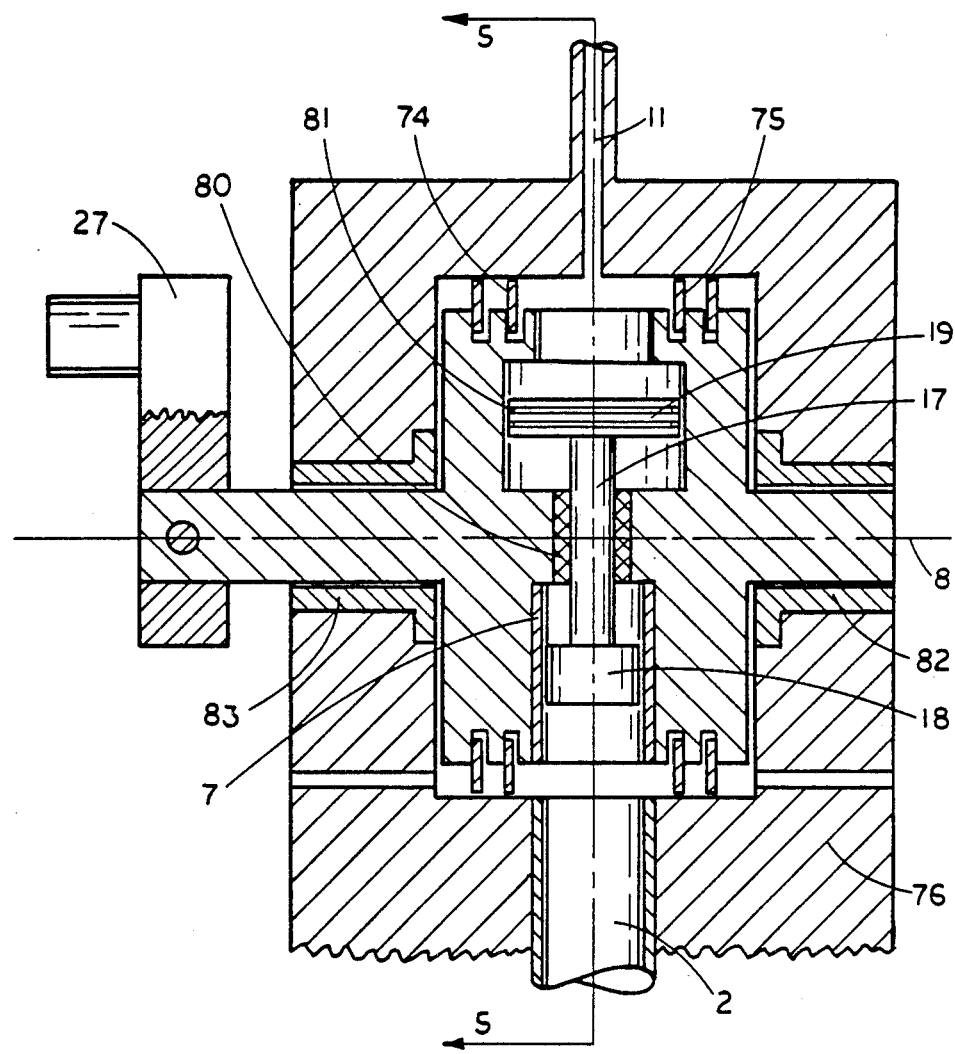
Figure 5:
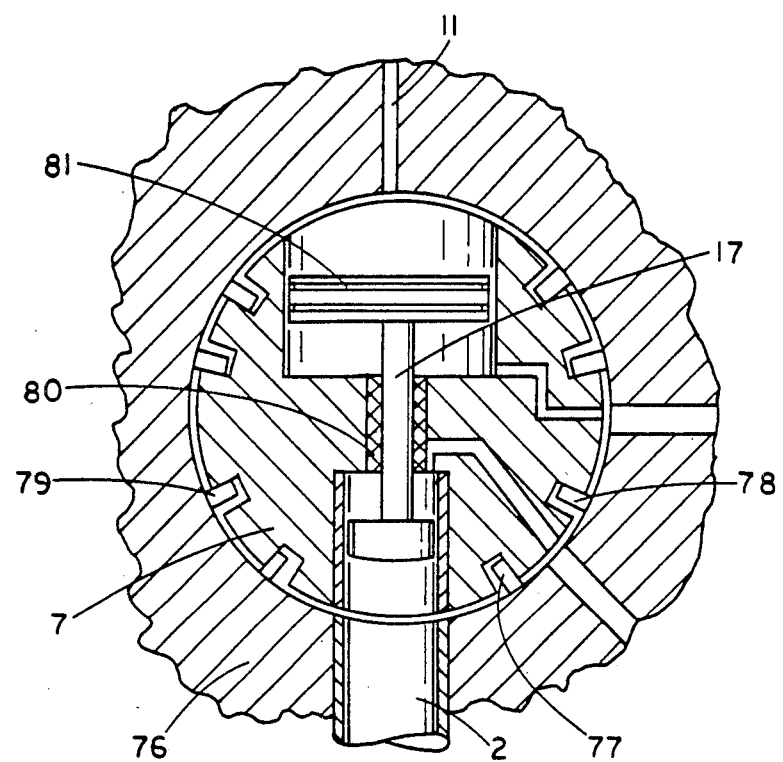

Sealing means to reduce gas leakage from the combustion chamber and refuel means and ash removal means are shown in cross section in FIG. 4 and also in FIG. 5 which is a cross section, as shown, of FIG. 4.

Figure 6:
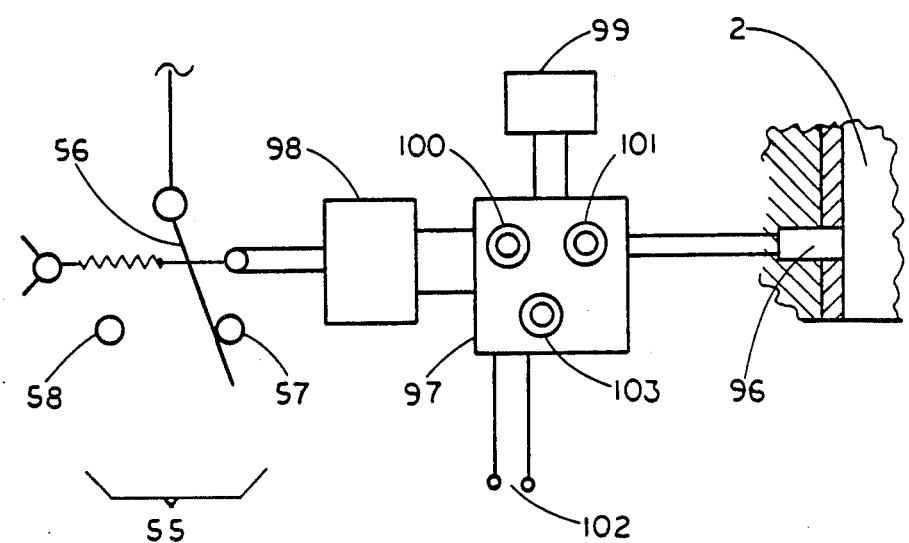

A modification of the control means of FIG. 3 is shown in FIG. 6 which makes this control means suitable for controlling the drive means of untimed ash removal means.

DESCRIPTION OF THE PREFERRED EMBODIMENTS

Char burning engines using cyclic compression and expansion of gases into and out of a char fuel mass contained within a combustion chamber are described in the following places in U.S. Pat. No. 4,412,511: column 1 line 1 through column 39 line 43; column 40 line 65 through column 41 line 29; FIGS. 1 through 9 inclusive; FIGS. 11 through 24 inclusive; and this material is incorporated herein by reference thereto. These char burning engines of U.S. Pat. No. 4,412,511 preferably use a timed refuel and reload mechanism and, where dry ash removal is used, a timed ash removal mechanism. Since refuel and reload and ash removal processes are to occur only about once every 100 or more engine cycles, these timed refuel, reload and ash removal mechanisms operate only during a small portion of the engine cycles but each refuel and ash removal process is preferably completed during the exhaust and intake processes of a single engine cycle. In consequence of these timing requirements, the refuel, reload, and ash removal mechanism drive means are mechanically complicated and must be quick acting and hence require large driving forces.

In the invention described herein untimed refuel and reload and ash removal means are substituted for the timed refuel and reload and ash removal mechanisms of U.S. Pat. No. 4,412,511. For these untimed means the refuel and reload and ash removal processes can be carried out at any time and reasonably slowly during several engine cycles. In consequence, simpler drive mechanisms using smaller driving forces can be used with these untimed means, and this is a principal beneficial object of the invention described herein. Additional sealing means are needed for untimed refuel and ash removal means to prevent excess gas leakage during compression and expansion processes of the engine cycle.

An untimed refuel and reload means of this invention comprises the following elements:
(1) A moveable refuel portion of the combustion chamber, located at the refuel end of the engine combustion chamber, is used and can be moved into alignment with the reload means when reloading is to occur and then can be moved back into alignment with the combustion chamber until reloading with char fuel is again needed.

(2) A fuel drive means is used for applying a drive force for forcing the char fuel out of the moveable refuel portion and into the combustion chamber when the moveable refuel portion is aligned with the combustion chamber. This drive force is retracted when the moveable refuel portion is aligned with the reload means so reloading can take place. When this drive force has forced all or most of the previously reloaded char fuel out of the moveable refuel portion and into the combustion chamber, it is again time to reload the moveable refuel portion.

(3) A reload means is used to reload char fuel from a char fuel supply source, such as a fuel hopper, into the moveable refuel portion whenever the latter is aligned with this reload means. A drive means can force the char fuel into the moveable refuel portion and then this drive means is retracted when the moveable refuel portion is no longer aligned with the reload means. Alternatively, the fuel hopper can feed fuel directly into the moveable refuel portion as a reload means.

(4) A refuel drive means is used to drive the moveable refuel portion into alignment with the reload means, when reloading is required, and to hold this reload alignment until reloading is completed, and then to drive the moveable refuel portion into alignment with the combustion chamber after reloading is completed and to hold this combustion chamber alignment until reloading is again needed.

(5) A refuel control means is used for controlling the refuel drive means so that a reload sequence of steps is carried out whenever the fuel drive means has forced all or most of the previously reloaded char fuel out of the moveable refuel portion and into the combustion chamber. A reload sequence comprises moving the moveable refuel portion into alignment with the reload means and then subsequently moving the moveable refuel portion back into alignment with the combustion chamber after reloading is completed.

(6) Refuel sealing means are used to seal against gas leakage between the combustion chamber and the moveable refuel portion and also between the moveable refuel portion and the fuel drive means.

Note that reloading occurs only when needed and is not timed to the engine cycles and can occur reasonably slowly over a period of several engine cycles.

An untimed ash removal means of this invention comprises the following elements:

(7) A moveable ash portion of the combustion chamber, located at the ash removal end of the engine combustion chamber, is used and can be moved into alignment with the ash pit when ash removal is to occur and then can be moved back into alignment with the combustion chamber to again collect ashes.

(8) An ash removal means is used for applying a drive force for removing ashes from the moveable ash portion and into the ash pit when the moveable ash portion is aligned with the ash pit. This drive force is retracted when the moveable ash portion is aligned with the combustion chamber so that ashes can again fill into the moveable ash portion. The ash pit is simply a place where the ashes are dumped upon removal.

(9) An ash drive means is used to drive the moveable ash portion into alignment with the ash pit when ashes are to be removed, and to hold this removal alignment until removal is completed, and then to drive the moveable ash portion into alignment with the combustion chamber and to hold this combustion chamber alignment until ash removal is again to be carried out.

(10) An ash level sensor means is used to sense the approximate position of the ash level relative to the moveable ash portion. We define ash level as the boundary zone between char fuel containing appreciable amounts of as yet unburned carbon and char fuel containing very little or no unburned carbon.

(11) An ash removal control means is used to control the ash drive means so that an ash removal sequence of steps is carried out whenever the ash level is sensed by the ash level sensor to be appreciably inside the combustion chamber, and hence well outside the moveable ash portion. In this way, an ash removal sequence takes place only when the ashes within the moveable ash portion are essentially free of any unburned carbon fuel. An ash removal sequence comprises moving the moveable ash portion into alignment with the ash pit and then subsequently moving the moveable ash portion back into alignment with the combustion chamber after ash removal is completed.

(12) Ash removal sealing means are used to seal against gas leakage between the combustion chamber and the moveable ash portion and also between the moveable ash portion and the ash removal means.

Note again that ash removal occurs only when needed and is not timed to the engine cycles and can occur reasonably slowly over a period of several engine cycles. The untimed ash removal means is similar to the untimed refuel and reload means except that the latter adds char fuel into the combustion chamber whereas the former removes ashes from the combustion chamber.

In addition to the foregoing elements, a source for energizing the several drive means and control means is needed. Any of various kinds of energizing sources can be used alone or in combination such as mechanical drive, or electric drive, or hydraulic drive, or pneumatic drive, from the engine shaft or other drive motor.

These untimed refuel and reload means and untimed ash removal means can also be used to similar advantage on the cyclic solid gas reactors described in my cross-referenced U.S. patent application, Ser. No. 06/473566, filed March 9, 1983, as substitutes for the timed refill means and reload means and also for the timed removal means described therein. Herein and in the claims the terminology used in my U.S. Pat. No. 4,412,511 is used to include the corresponding elements of both the char burning engines of U.S. Pat. No. 4,412,511 and the cyclic solid gas reactors of Ser. No. 06/473566. These corresponding elements terms are listed together below:

a. Char burning engine, and, cyclic reactor machine.

b. Combustion chamber, and, reaction chamber.

c. Char fuel supply source, and, solid reactant supply source.

d. Refuel end of combustion chamber, and, refill end of reaction chamber.

e. Ash removal end of combustion chamber, and, removal end of reaction chamber.

f. Timed refuel means and reload means, and, timed refill means and reload means. The timed refuel means and reload means comprises the following elements of a char burning engine of U.S. Pat. No. 4,412,511, and the corresponding elements of a cyclic solid gas reactor of Ser. No. 06/473566: means for reloading fresh char fuel into the refuel mechanism; means for sealing the refuel end of the combustion chamber and for refueling char fuel into the combustion chamber; refuel mechanism;

refuel interval setter means; refuel block and drive means.

g. Timed ash removal means, and, timed removal means. The timed ash removal means comprises the following elements of a char burning engine of U.S. Pat. No. 4,412,511 and the corresponding elements of a cyclic solid gas reactor of Ser. No. 06/473566: ash removal mechanism; ash removal block and drive means; means for initiating the ash removal block drive means; ash level sensor and control means; ash removal interval setter means.

Cyclic solid gas reactors are described in my copending U.S. patent application Ser. No. 06/473566, filed Mar. 9, 1983, at the following places: FIGS. 1 through 18 inclusive; page 1 line 1 through page 64 line 25; and this material is incorporated herein by reference.

These untimed refuel and reload means and untimed ash removal means can also be used to similar advantage on the char burning free piston gas generators described in my U.S. Pat. No. 4,372,256, issued Feb. 8, 1983, as substitutes for the timed refuel means and reload means and also for the timed ash removal means described therein. Herein and in the claims the terminology used in my U.S. Pat. No. 4,412,511 is used to include also the corresponding elements of char burning free piston gas generators of U.S. Pat. No. 4,372,256. These corresponding elements terms are listed together below where different:

h. Char burning engine, and, free piston gas generator.

Char burning free piston gas generators are described in my U.S. Pat. No. 4,372,256, issued Feb. 8, 1983 at the following places: FIGS. 1 through 23 inclusive; FIGS. 25 and 26; column 1 line 1 through column 37 line 52; column 39 line 3 through column 40 line 5; and this material is incorporated herein by reference.

Figure 1:
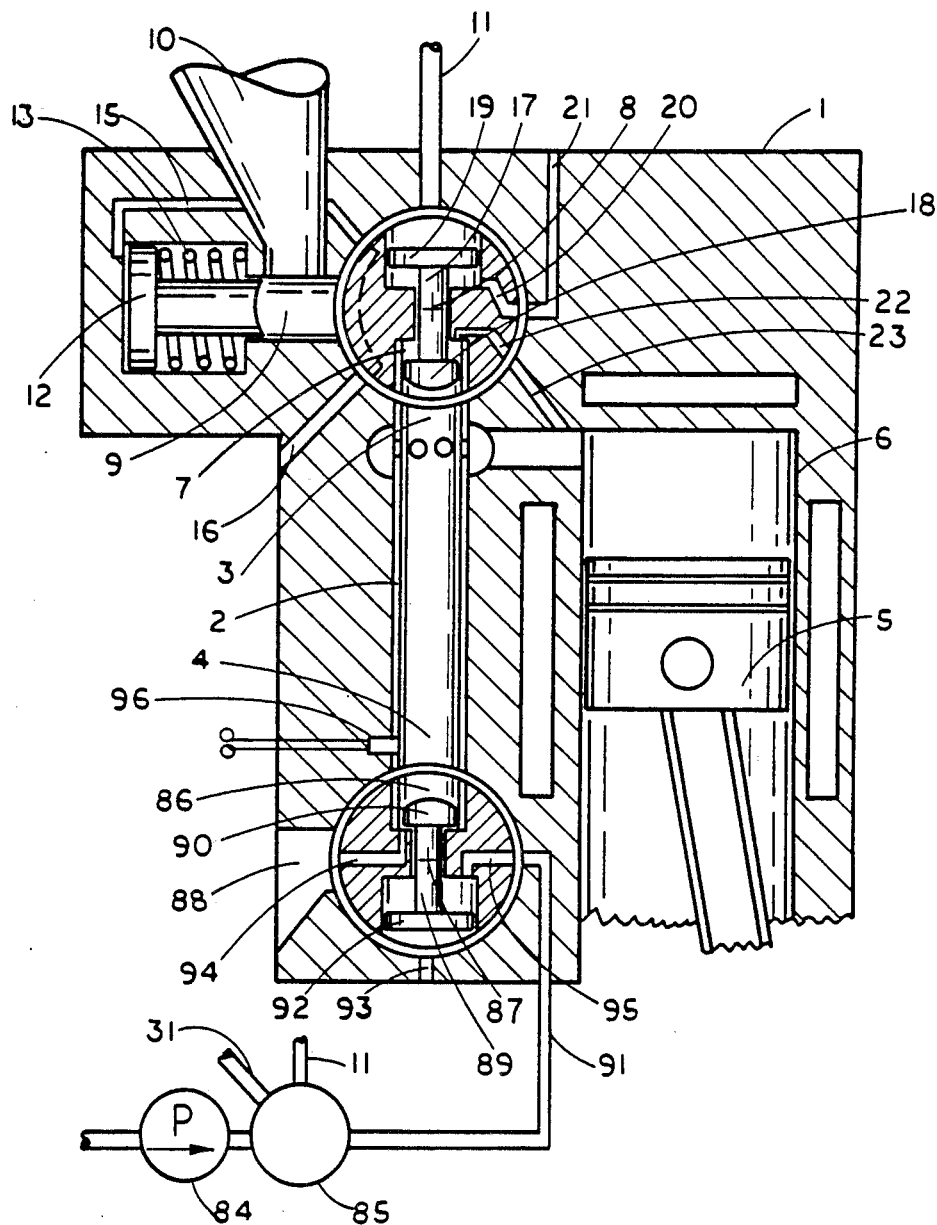
In FIG. 1 a cross-sectional view is shown of a char burning engine equipped with an untimed refuel and reload means and with an untimed ash removal means.

I. Details of Refuel and Reload:

One example of an untimed refuel and reload means is shown partially in FIG. 1 and comprises the following:

(A) A char burning engine, 1, comprising a combustion chamber, 2, with a refuel end, 3, and an ash removal end, 4, from which any timed refuel means and reload means have been removed. Additionally, only the piston, 5, and cylinder, 6, of the char burning engine mechanism are shown in FIG. 1, the crankshaft, valves or ports and other elements not being shown thereon.

(B) A moveable refuel portion, 7, of the combustion chamber rotatable about the axis, 8, so that the refuel portion, 7, can be aligned with the refuel end, 3, of the combustion chamber, 2, as shown in FIG. 1, or can be rotated to align similarly with the reload means, 9.

(C) A means for reloading, 9, char fuel from a char fuel supply hopper, 10, into the moveable refuel portion, 7, when the latter is aligned with the reload means, 9. A pneumatic drive means using high pressure gas from the pipe, 11, drives the reload ram, 12, against the return spring, 13, to force char fuel into the moveable refuel portion, 7. When the moveable refuel portion, 7, is aligned with the reload means, 9, the high pressure gas from pipe, 11, passes via the channel, 14, and the passage, 15, to act upon the reload ram, 12. When the moveable refuel portion, 7, is aligned with the combustion chamber, 2, gas is vented from the reload ram, 12, via the passage, 15, channel, 14, and vent passage, 16, as shown in FIG. 1, and the return spring, 13, retracts the reload ram, 12, so that another portion of char fuel can pass from the supply hopper, 10, into the reload means, 9.

(D) A means for applying a drive force to force char fuel out of the moveable refuel portion, 7, and into the refuel end, 3, of the combustion chamber, 2, comprises: the fuel drive ram, 17, acting at the ram end, 18, to drive fuel into the combustion chamber, 2, when high pressure gas from the pipe, 11, acts on the force end, 19, whenever the moveable refuel portion is aligned with the combustion chamber 2, as shown in FIG. 1. During this combustion chamber alignment the force end, 19, back side is vented via the port, 20, and passage, 21, and the ram end, 18, back side is pressure balanced with the combustion chamber, 2, via the port, 22, and passage, 23. When the moveable refuel portion, 7, is aligned with the reload means, 9, the force end, 19, is vented via the passage, 21, the ram end back side is vented via the port, 22, and the vent passage, 16, and the fuel drive ram, 17, is retracted by the force of the reload ram, 12. The several ports and channels, 20, 22, 14, do not index or align with the combustion chamber, 2.

An example of a pneumatic refuel drive means suitable for driving the moveable refuel portion, 7, of FIG. 1 is shown partially in FIG. 2 and comprises the following:

(E) The drive piston, 24, acts via the piston rod, 25, connecting rod, 26, and crank, 27, to rotate the moveable refuel portion, 7, about the axis, 8. When the drive piston, 24, is against the reload stop, 28, the moveable refuel portion, 7, is aligned with the reload means, 9. When the drive piston, 24, is against the refuel stop, 29, the moveable refuel portion, 7, is aligned with the combustion chamber, 2.

(F) The drive piston, 24, is driven inside the drive cylinder, 30, by application of high pressure gas from the pipe, 31, via the drive selector valve, 32, and the restrictor and check valve passages, 33, 34, while the non-driven side of the piston, 24, is concurrently vented via the restrictor and check valve passages, 35, 36, and the drive selector valve, 32, and vent passage, 37. As shown in FIG. 2, high pressure gas is passing from pipe, 31, via selector valve port, 38, passage, 34, restrictor, 39, open check valve, 40, and is thus driving piston, 24, toward the reload stop, 28, and hence the moveable refuel portion, 7, is being driven into alignment with the reload means, 9. The reverse side of piston, 24, is concurrently being vented via open check valve, 41, restrictor, 42, passage, 35, selector valve port, 43, and vent passage, 37. The drive piston, 24, is thusly driven toward and held against the reload stop, 28, as long as the selector valve, 32, position remains at reload as shown in FIG. 2. When, however, the selector valve, 32, is rotated 90 degrees counterclockwise from this reload position, by moving the selector valve lever, 44, from the reload position, 45, to the dotted refuel position, 46, the selector valve, 32, is then in the refuel position. In the refuel position high pressure gas passes from pipe, 31, via selector valve port, 38, passage, 33, restrictor, 47, open check valve, 48, and is then driving piston, 24, toward the refuel stop, 29, and hence the moveable refuel portion, 7, is being driven into alignment with the combustion chamber, 2. The reverse side of piston, 24, is then concurrently being vented via open check valve, 49, restrictor, 50, passage, 36, selector valve port, 43, and vent passage, 37. The drive piston, 24, is thusly driven toward and held against the refuel stop, 29, as long as the selector valve, 32, position remains at refuel. The cushion pistons, 51, 52, index closely into the cushion cylinders, 53, 54, as the piston, 24, nears the stops, 28, 29, and the thusly restricted flow of venting gas slows down the piston, 24, motion as the stops, 28, 29, are approached. The piston motion is also slowed by flow restriction of both venting gas and driving gas due to the restrictors, 39, 42, 47, 50.

An example of an electrical control means for controlling the refuel drive means shown in FIG. 2 is shown schematically in FIG. 3 and comprises the following:

(G) A reload solenoid driver, 51, which moves the selector valve lever, 44, into the reload position, 45, when energized.

(H) Another refuel solenoid driver, 52, which moves the selector valve lever, 44, into the refuel position, 46, when energized.

(I) A reload relay, 53, with switch arm, 59, and a refuel relay, 54, with switch arm, 60.

(J) A reload switch, 55, whose switch arm, 56, is closed to reload contact, 57, by the final motion of the fuel drive ram, 17, as it empties the moveable refuel portion, 7, of char fuel. The switch arm, 56, is spring closed to refuel contact, 58, when the fuel drive ram, 17, is retracted during reloading.

(K) A refuel switch, 61, whose switch arm, 62, is closed to reload contact, 63, by the final motion of the reload ram, 12, as it completes the reloading of the moveable refuel portion, 7, with char fuel. The switch arm, 62, is spring closed to reload contact, 64, when the reload ram, 12, is retracted during refueling.

(L) An electrical energizing source, 65, such as a generator or a battery.

This electrical control means shown in FIG. 3 controls the refuel drive means shown in FIG. 2 to carry out a reload sequence of steps whenever the fuel drive ram, 17, has forced almost all of the previously reloaded char fuel out of the moveable refuel portion, 7, and into the combustion chamber, 2. This reload sequence of steps proceeds as follows:

(1) As the fuel drive ram, 17, empties the moveable refuel portion, 7, reload switch, 55, is closed to reload contact, 57, thereby energizing reload relay, 53, since refuel switch, 61, is spring closed to reload contact, 64. Energizing reload relay, 53, closes switch arm, 59, across contacts, 66, 67, thereby energizing reload solenoid, 51, and moving selector valve lever, 44, into the reload position, 45. In consequence, the moveable refuel portion is moved by the refuel drive means of FIG. 2, into alignment with the reload means, 9, and reloading takes place as described hereinabove. Switch arm, 59, also closes across contacts, 68, 69, which holds the reload relay, 53, energized even when reload switch, 55, is spring closed to refuel contact, 58, as occurs when the fuel drive ram, 17, is retracted while reloading is taking place. In consequence, the reload solenoid, 51, remains energized and the moveable refuel portion, 7, remains aligned with the reload means, 9, until reloading is completed.

(2) Upon completion of reloading refuel switch, 61, is opened from reload contact, 64, and closed to refuel contact, 63, by the final motion of the reload ram, 12, as reloading is completed. In consequence, reload relay, 53, and reload solenoid, 51, are deenergized, refuel relay, 54, is energized since reload switch, 55, is spring closed to refuel contact, 58. Energizing refuel relay, 54, closes switch arm, 60, across contacts, 70, 71, thereby energizing refuel solenoid, 52, and moving selector valve lever, 44, into the refuel position, 46. In consequence, the moveable refuel portion is moved by the refuel drive means of FIG. 2, into alignment with the combustion chamber, 2, and refueling occurs as described hereinabove. Switch arm, 60, also closes across contacts, 72, 73, which holds the refuel relay, 54, energized even when refuel switch, 61, is spring closed to reload contact, 64, as occurs when the reload ram, 12, is retracted after refueling commences. In consequence, the refuel solenoid, 52, remains energized and the moveable refuel portion, 7, remains aligned with the combustion chamber, 2, until reloading is again required.

One example scheme for sealing the combustion chamber, 2, and the moveable refuel portion, 7, when aligned with the combustion chamber, 2, is shown in cross section in FIG. 4 and FIG. 5, which is the section, 5—5, of FIG. 4. Several refuel seals are needed to prevent excess gas leakage during engine compression and expansion processes as follows:

(1) Axial seals, 74, 75, prevent gas leakage from the combustion chamber, 2, between the moveable refuel portion, 7, and its housing, 76. Ring seals in slots are shown in FIG. 4 for these axial seals.

(2) Peripheral seals, 77, 78, 79, etc., prevent gas leakage from the combustion chamber, 2, around the periphery between the moveable refuel portion, 7, and its housing, 76. Bar seals in slots are shown in FIG. 5 for these peripheral seals.

(3) The ram seal, 80, prevents gas leakage between the fuel drive ram, 17, and the moveable refuel portion, 7. A rubbing packing gland type of seal is shown in FIGS. 4 and 5 for this ram seal.

(4) A ram force end seal, 81, prevents high pressure drive gas leakage between the force end, 19, of the fuel drive ram, 17, and the moveable refuel portion, 7. A labyrinth seal in the form of two or more peripheral slots is shown in FIGS. 4 and 5 for this ram force end seal.

Particular kinds of seals are shown in FIGS. 4 and 5 but other kinds of seals can also be used. For example, labyrinth seals could be used for all of the seals and would reduce rubbing and friction.

The moveable refuel portion, 7, is shown in FIG. 4 as rotatable about the axis, 8, on the bearings, 82, 83, and this arrangement is preferred since these bearings, 82, 83, can absorb any side thrust load on the moveable refuel portion, 7, generated by the gas pressure of compression and expansion in the combustion chamber, 2. In this way, the moveable refuel portion, 7, need not rub upon its housing, 76. This bearing support scheme can also be used on the moveable ash portion, 86, described hereinbelow.

An engine driven air compressor, 84, and tank, 85, are shown in FIG. 1 as the pneumatic energizing source for the fuel drive means and reload drive means via pipe, 11, and the refuel drive means via pipe, 31, of the example untimed refuel and reload means shown in FIGS. 1, 2, 3, 4, and 5. But other drive means and energizing means, such as hydraulic or electric, can be substituted for pneumatic drive and energizing means.

II. Details of Ash Removal:

One example of an untimed ash removal means is shown partially in FIG. 1 and comprises the following:

(A) The char burning engine, 1, comprising a combustion chamber, 2, with a refuel end, 3, and an ash removal end, 4, from which any timed ash removal means has been removed.

(B) A moveable ash portion, 86, of the combustion chamber rotatable about the axis, 87, so that the ash portion, 86, can be aligned with the ash removal end, 4, of the combustion chamber, 2, as shown in FIG. 1, or can be rotated to align similarly with the ash pit, 88.

(C) An ash removal drive means for applying a drive force to force ashes out of the moveable ash portion, 86, and into the ash pit, 88, comprises: the ash drive ram, 89, acting at the ram end, 90, to drive ashes into the ash pit, 88, when high pressure gas from the pipe, 91, acts on the force end, 92, whenever the moveable ash portion, 86, is aligned with the ash pit, 88. During this ash pit alignment the force end, 92, back side is vented by ports and passages not shown in FIG. 1. When the moveable ash portion, 86, is aligned with the combustion chamber, 2, as shown in FIG. 1, the force end, 92, is vented via the passage, 93, the ram end, 90, back side is vented via the port, 94, and the force end, 92, back side is driven to retract the ash drive ram by high pressure gas from the pipe, 91, via the port, 95. The several ports, 95, 94, etc. do not index or align with the combustion chamber, 2.

The pneumatic refuel drive means shown in FIG. 2 and described hereinabove is also suitable for use as an ash drive means with the modifications as follows:

(1) When the drive piston, 24, is against the stop, 28, the moveable ash portion, 86, is aligned with the ash pit, 88. The selector valve lever, 44, is then in the removal position, 45.

(2) When the drive piston, 24, is against the stop, 29, the moveable ash portion, 86, is aligned with the combustion chamber, 2. The selector valve lever, 44, is then in the collection position, 46.

The electrical control means shown in FIG. 3 and described hereinabove is also suitable for use to control the ash drive means with the modifications as follows:

(3) The switch, 61, is closed to the contact, 63, by the final motion of the ash drive ram, 89, when removal of ashes from the moveable ash portion, 86, into the ash pit, 88, is completed. The switch arm, 62, is spring closed to the contact, 64, when the ash drive ram, 89, is retracted when the moveable ash portion, 86, is aligned with the combustion chamber, 2.

(4) The switch, 55, is closed to the contact, 57, by action of the ash level sensor, 96, and ash level controller, 97, shown in FIG. 1 and FIG. 6, which comprises the following:

(i) The ash level sensor, 96, senses when the ash level position is well inside the combustion chamber, 2, relative to the moveable ash portion, 86, and thus senses when the moveable ash portion, 86, is full of ashes essentially free of unburned carbon fuel.

(ii) The ash level controller, 97, energizes the solenoid, 98, when the ash level sensor shows the ash level to be well inside the combustion chamber. The solenoid, 98, when thusly energized closes the switch, 55, to the contact, 57, thus energizing solenoid, 51, and moving selector valve lever, 44, to the removal position, 45. In consequence, the moveable ash portion, 86, becomes aligned with the ash pit, 88, and ashes are removed by action of the ash drive ram, 89. This ash pit alignment is held until completion of ash removal when switch, 61, is closed to contact, 63, thus deenergizing relay, 53, and solenoid, 51, and energizing relay, 54, and solenoid, 52.

(iii) A timer, 99, acts via the ash level controller, 97, to deenergize the solenoid, 98, after a removal time interval, and the switch, 55, is then spring closed to contact, 58. This removal time interval is set shorter than the time required for the ash drive ram, 89, to complete the removal of ashes from the moveable ash portion, 86. This removal time interval can be set into the ash level controller via the knob, 100.

(iv) Thus, when ash removal into the ash pit is completed the solenoid, 51, is deenergized, the solenoid, 52, is energized, the selector valve lever, 44, is moved to the collection position, 46. In consequence, the moveable ash portion becomes aligned with the combustion chamber, 2, and collection of ashes therein commences again.

(v) Commonly the ash level sensor, 96, may respond rather slowly to the changed conditions inside the combustion chamber, 2, following completion of an ash removal sequence as described. Hence, the sensor, 96, and controller, 97, may promptly call for another ash removal sequence shortly after one such sequence is completed and unburned fuel will, in consequence, be wasted by removal into the ash pit. To prevent this result, the timer, 99, may also act via the ash level controller, 97, to keep the solenoid, 98, deenergized for another collection time interval. This collection time interval is set longer than the time required for the ash level sensor, 96, to respond correctly to the changed conditions inside the combustion chamber, 2, following completion of an ash removal sequence. This collection time interval can be set into the ash level controller via the knob, 101. The combustion chamber alignment is thus held until enough new ashes have accumulated to raise the ash level out of the moveable ash portion, 86, and well into the combustion chamber, 2, when another ash removal sequence is again called for.

(vi) The timer can set time intervals in terms of engine crankshaft revolutions using a revolutions counter or preferably in time units using a clock device.

(vii) The ash level controller, 97, can be an electronic controller, energized from a power source, 102, and responding to inputs from the ash level sensor, 96, and the timer, 99, with output to the solenoid, 98. Electronic controllers of this type are well known in the art of electronic controls.

(viii) The ash level sensor, 96, can be any of the various types of ash level sensors described in the material incorporated herein by reference from U.S. Pat. No. 4,412,511. Alternatively, an oxygen sensor can be used on the combustion chamber wall at the ash removal end, 4, as shown in FIG. 1, such as the Zirconia oxygen sensors used in some automobile engine exhaust manifolds, provided an air passage is placed to pass air from the engine cylinder into the ash removal end, 4, of the combustion chamber, 2, during compression. With this arrangement, when the ash level is well inside the combustion chamber relative to the moveable ash portion, the air admitted at this ash removal end will not react since no carbon is present and the oxygen sensor will respond to this oxygen in the unreacted air. The ash sensor output required to initiate an ash removal sequence can be set into the ash level controller via the knob, 103.

The untimed ash removal means described above is very similar in construction and operation to the untimed refuel and reload means also described above except that this ash removal means removes ashes from the combustion chamber whereas the refuel and reload means adds fresh char fuel into the combustion chamber to replace fuel burned up.

The engine driven air compressor, 84, and tank, 85, can also function as the pneumatic energizing source for the ash drive means and the ash removal means via pipe, 91, and pipe, 31. The air compressor, 84, can alternatively be driven by a motor separate from the engine itself, such as an electric motor.

The ash sealing means for sealing the combustion chamber, 2, and the moveable ash portion, 86, when aligned with the combustion chamber, 2, against gas leakage during engine compression and expansion processes can be similar to the refuel seals shown in FIGS. 4 and 5 and described hereinabove.

Particular examples of various drive means and control means and sealing means are described hereinabove to illustrate the invention, but is not intended thereby to limit the invention to these illustrative examples. Many different kinds of drive means and control means and sealing means are suitable for use with this invention.

Having thus described my invention, what I claim is:

1. The combination of a char burning engine using cycles of compression and expansion processes comprising, a combustion chamber comprising a refuel end and a timed refuel means and reload means, wherein the improvement comprises replacing said timed refuel means and reload means with an untimed refuel means and reload means, said untimed refuel means and reload means comprising:

a char fuel supply source;

a moveable portion of said combustion chamber at said refuel end of said combustion chamber, said portion being a moveable refuel portion;

a means for reloading char fuel from said char fuel supply source into said moveable refuel portion when said moveable refuel portion is aligned with said reload means and comprising a means for driving said reloading, said means being a reload means;

a means for applying a drive force for forcing char fuel out of said moveable refuel portion and into said combustion chamber when said moveable refuel portion is aligned with said combustion chamber, and for retracting said fuel drive force when said moveable refuel portion is aligned with said reload means, said means being a fuel drive means;

a means for driving said moveable refuel portion into alignment with said reload means when reloading is to be carried out, and for holding said reload alignment until reloading is completed, and for driving said moveable refuel portion into alignment with said combustion chamber when reloading is completed, and for holding said combustion chamber alignment until reloading is again to be carried out, said drive means being a refuel drive means;

a means for controlling said refuel drive means so that a reload sequence of steps is carried out whenever said fuel drive means has forced out of said moveable refuel portion and into said combustion chamber a fixed portion of the char fuel previously reloaded into said moveable refuel portion, said reload sequence comprising the following steps carried out in the following order; said moveable refuel portion is moved into alignment with said reload means and reloading with char fuel occurs, said moveable refuel portion is moved into alignment with said combustion chamber when reloading is completed, said control means being a refuel control means;

a means for sealing said combustion chamber, and said moveable refuel portion when aligned with said combustion chamber, against gas leakage during all compression and expansion processes of said char burning engine, said sealing means being a refuel sealing means;

a means for energizing all of said drive means and control means.

2. The combination of a char burning engine using cycles of compression and expansion processes comprising, a combustion chamber comprising a refuel end and an ash removal end, a timed refuel means and reload means, and a timed ash removal means, wherein the improvement comprises replacing said timed ash removal means with an untimed ash removal means, said untimed ash removal means comprising:

an ash pit;

a moveable portion of said combustion chamber at said ash removal end of said combustion chamber, said portion being a moveable ash portion;

a means for applying a drive force for removing ashes out of said moveable ash portion and into said ash pit when said moveable ash portion is aligned with said ash pit, and for retracting said ash drive force when said moveable ash portion is aligned with said combustion chamber, said means being an ash removal means;

a means for driving said moveable ash portion into alignment with said ash pit when ashes are to be removed, and for holding said ash pit alignment until ash removal is completed, and for driving said moveable ash portion into alignment with said combustion chamber when ash removal is completed, and for holding said combustion chamber alignment until ash removal is again to be carried out, said drive means being an ash drive means;

a means for sensing the position of the ash level in said combustion chamber relative to said moveable ash portion, said means being an ash level sensor;

a means for controlling said ash drive means, responsive to said ash level sensor so that an ash removal sequence of steps is carried out whenever said ash level sensor senses the ash level position to be appreciably inside said combustion chamber, said ash removal sequence comprising the following steps carried out in the following order; said moveable ash portion is moved into alignment with said ash pit and ash removal occurs, said moveable ash portion is moved into alignment with said combustion chamber when ash removal is completed, said control means being an ash removal control means;

a means for sealing said combustion chamber, and said moveable ash portion when aligned with said combustion chamber, against gas leakage during all compression and expansion processes of said char burning engine, said sealing means being an ash removal sealing means;

a means for energizing all of said drive means and said control means.

3. The combination of a char burning engine using cycles of compression and expansion processes comprising, a combustion chamber comprising a refuel end and an ash removal end, a timed refuel means and reload means, and a timed ash removal means, wherein the improvement comprises replacing said timed refuel means and reload means, and replacing said timed ash removal means, with an untimed refuel means and reload means, and with an untimed ash removal means, said untimed refuel means and reload means comprising:

a char fuel supply source;

a moveable portion of said combustion chamber at said refuel end of said combustion chamber, said portion being a moveable refuel portion;

a means for reloading char fuel from said char fuel supply source into said moveable refuel portion when said moveable refuel portion is aligned with said reload means and comprising a means for driving said reloading, said means being a reload means;

a means for applying a drive force for forcing char fuel out of said moveable refuel portion and into said combustion chamber when said moveable refuel portion is aligned with said combustion chamber, and for retracting said fuel drive force when said moveable refuel portion is aligned with said reload means, said means being a fuel drive means;

a means for driving said moveable refuel portion into alignment with said reload means when reloading is to be carried out, and for holding said reload alignment until reloading is completed, and for driving said moveable refuel portion into alignment with said combustion chamber when reloading is completed, and for holding said combustion chamber alignment until reloading is again to be carried out, said drive means being a refuel drive means;

a means for controlling said refuel drive means so that a reload sequence of steps is carried out whenever said fuel drive means has forced out of said moveable refuel portion and into said combustion chamber a fixed portion of the char fuel previously reloaded into said moveable refuel portion, said reload sequence comprising the following steps carried out in the following order; said moveable refuel portion is moved into alignment with said reload means and reloading with char fuel occurs, said moveable refuel portion is moved into alignment with said combustion chamber when reloading is completed, said control means being a refuel control means;

a means for sealing said combustion chamber, and said moveable refuel portion when aligned with said combustion chamber, against gas leakage during all compression and expansion processes of said char burning engine, said sealing means being a refuel sealing means;

a means for energizing all of said drive means and said control means;

said untimed ash removal means comprising:

an ash pit;

a moveable portion of said combustion chamber at said ash removal end of said combustion chamber, said portion being a moveable ash portion;

a means for applying a drive force for removing ashes out of said moveable ash portion and into said ash pit when said moveable ash portion is aligned with said ash pit, and for retracting said ash drive force when said moveable ash portion is aligned with said combustion chamber, said means being an ash removal means;

a means for driving said moveable ash portion into alignment with said ash pit when ashes are to be removed, and for holding said ash pit alignment until ash removal is completed, and for driving said moveable ash portion into alignment with said combustion chamber when ash removal is completed, and for holding said combustion chamber alignment until ash removal is again to be carried out, said drive means being an ash drive means;

a means for sensing the position of the ash level in said combustion chamber relative to said moveable ash portion, said means being an ash level sensor;

a means for controlling said ash drive means, responsive to said ash level sensor, so that an ash removal sequence of steps is carried out whenever said ash level sensor senses the ash level position to be appreciably inside said combustion chamber, said ash removal sequence comprising the following steps carried out in the following order; said moveable ash portion is moved into alignment with said ash pit and ash removal occurs, said moveable ash portion is moved into alignment with said combustion chamber when ash removal is completed, said control means being an ash removal control means;

a means for sealing said combustion chamber and said moveable ash portion when aligned with said combustion chamber, against gas leakage during all compression and expansion processes of said char burning engine, said sealing means being a ash removal sealing means;

a means for energizing all of said drive means and said control means.

* * * * *